United States Patent
Perez de la Coba

(10) Patent No.: US 10,353,948 B2
(45) Date of Patent: Jul. 16, 2019

(54) CONTENT BASED IMAGE RETRIEVAL

(71) Applicant: SHAZURA, INC., San Francisco, CA (US)

(72) Inventor: Sira Perez de la Coba, Madrid (ES)

(73) Assignee: SHAZURA, INC., San Francisco, CA (US)

( * ) Notice: Subject to any disclaimer, the term of this patent is extended or adjusted under 35 U.S.C. 154(b) by 908 days.

(21) Appl. No.: 14/785,045

(22) PCT Filed: Aug. 8, 2014

(86) PCT No.: PCT/EP2014/067056
§ 371 (c)(1),
(2) Date: Oct. 16, 2015

(87) PCT Pub. No.: WO2015/032585
PCT Pub. Date: Mar. 12, 2015

(65) Prior Publication Data
US 2016/0078057 A1    Mar. 17, 2016

(30) Foreign Application Priority Data

Sep. 4, 2013 (ES) .................................. 201300816

(51) Int. Cl.
*G06F 15/00* (2006.01)
*G06F 16/583* (2019.01)
(Continued)

(52) U.S. Cl.
CPC ....... *G06F 16/5838* (2019.01); *G06K 9/6212* (2013.01); *G06T 7/10* (2017.01);
(Continued)

(58) Field of Classification Search
CPC ............... G06F 16/5838; G06F 16/583; G06F 16/7328; G06F 16/7847; G06F 16/532;
(Continued)

(56) References Cited

U.S. PATENT DOCUMENTS 5,253,302 A * 10/1993 Massen ..................... B07C 5/10
                                                                  382/110
5,579,471 A * 11/1996 Barber ................. G06K 9/4647
                                                                  715/700
(Continued)

FOREIGN PATENT DOCUMENTS

WO    WO-2008047280 A2 *  4/2008 ........... G06K 9/4652

OTHER PUBLICATIONS

Yang et al., 2012, "Multilayer graph cuts based unsupervised color-texture image segmentation using multivariate mixed student's t-distribution and regional credibility merging", pp. 1101-1124 (Year: 2012).*

(Continued)

*Primary Examiner* — Manav Seth
(74) *Attorney, Agent, or Firm* — Renner, Otto, Boisselle & Sklar, LLP

(57) ABSTRACT

A method and non-transitory computer readable medium for content based image retrieval. The method includes selecting a query image, segmenting the selected query image by applying a segmentation technique, extracting features from the segmented query image by determining at least two feature descriptors, including color feature descriptors and texture feature descriptors, and determining a similarity of the query image to a plurality of images included in a database using the determined at least two feature descriptors of the segmented query image, features being extracted from each of the plurality of images included in the database by determining the at least two feature descriptors, the color feature descriptors and the texture feature descriptors including a simultaneous combination of different color spaces, and global and local statistical measurements being carried out on the simultaneous combination of the different color spaces.

24 Claims, 9 Drawing Sheets

(51) Int. Cl.
*G06K 9/62* (2006.01)
*G06T 7/10* (2017.01)

(52) U.S. Cl.
CPC ............... *G06T 2207/10004* (2013.01); *G06T 2207/20112* (2013.01)

(58) Field of Classification Search
CPC .................. G06F 16/5862; G06T 7/10; G06T 2207/10004; G06T 2207/20112; G06T 2207/10024; G06T 11/001; G06T 7/40; G06T 7/90; G06K 9/6212; G06K 9/4604; G06K 9/4642; G06K 9/6267; G06K 9/4652; G06K 9/6221
See application file for complete search history.

(56) References Cited

U.S. PATENT DOCUMENTS

| | | | | |
|---|---|---|---|---|
| 5,893,095 A * | 4/1999 | Jain | ......................... | G06F 16/58 |
| 6,016,487 A * | 1/2000 | Rioux | ................. | G06K 9/00201 |
| | | | | 707/743 |
| 6,181,817 B1 * | 1/2001 | Zabih | .................. | G06F 16/5838 |
| | | | | 382/170 |
| 6,246,790 B1 * | 6/2001 | Huang | ................. | G06K 9/4652 |
| | | | | 382/162 |
| 6,445,834 B1 * | 9/2002 | Rising, III | .......... | G06F 16/5838 |
| | | | | 382/305 |
| 6,469,706 B1 * | 10/2002 | Syeda-Mahmood | ........................ | |
| | | | | G06K 9/4652 |
| | | | | 345/589 |
| 6,522,780 B1 * | 2/2003 | Pass | .................... | G06F 16/5838 |
| | | | | 382/170 |
| 6,584,221 B1 * | 6/2003 | Moghaddam | ........ | G06F 16/5838 |
| | | | | 382/165 |
| 6,594,383 B1 * | 7/2003 | Syeda-Mahmood | ........................ | |
| | | | | G06F 16/5838 |
| | | | | 382/162 |
| 6,628,824 B1 * | 9/2003 | Belanger | ............... | G06K 9/4652 |
| | | | | 382/165 |
| 6,631,364 B1 * | 10/2003 | Rioux | ................. | G06K 9/00201 |
| 7,035,465 B2 * | 4/2006 | Comaniciu | .............. | G06K 9/42 |
| | | | | 382/190 |
| 7,116,806 B2 * | 10/2006 | Werthiem | .......... | G06K 9/00073 |
| | | | | 382/124 |
| 7,356,171 B2 * | 4/2008 | Werthiem | .......... | G06K 9/00073 |
| | | | | 382/124 |
| 7,697,792 B2 * | 4/2010 | Keating | ............. | G06F 16/5838 |
| | | | | 382/305 |
| 7,702,185 B2 * | 4/2010 | Keating | ................ | G06F 16/583 |
| | | | | 382/305 |
| 9,547,807 B2 * | 1/2017 | Vidal Calleja | ....... | G06K 9/4676 |
| 10,192,117 B2 * | 1/2019 | Loui | .................. | G06K 9/00765 |
| 2009/0125487 A1 | 5/2009 | Rossi et al. | | |
| 2009/0281925 A1 * | 11/2009 | Winter | ............... | G06Q 30/0601 |
| | | | | 705/26.1 |
| 2014/0254923 A1 * | 9/2014 | Vidal Calleja | ....... | G06K 9/4676 |
| | | | | 382/159 |

OTHER PUBLICATIONS

International Search Report and Written Opinion for corresponding patent application No. PCT/EP2014/067056 dated Dec. 2, 2014.

* cited by examiner

CONTENT BASED IMAGE RETRIEVAL

This application is a national phase of International Application No. PCT/EP2014/067056 filed Aug. 8, 2014 and published in the English language.

FIELD OF THE INVENTION

This invention relates generally to computer vision, object, and image recognition technologies. In particular, the invention relates to a method and a non-transitory computer readable medium for content based image retrieval using unique high-level image feature generic descriptors. The invention also relates to using objective and optionally subjective weighing-similarity based implementations, and optimized computation of the distance between query image and potentially similar ones.

BACKGROUND OF THE INVENTION

The importance of image recognition in our society is growing day by day, as computers and the virtual sphere take root.

The field of application of visual search engines and computer vision, object and pattern recognition technologies is broad, and has spread to a wide range of different uses and sectors, such as: industrial and machine vision, navigation, process control, homeland security, e-commerce, medical diagnosis, biological research, people identification and biometrics, marketing, social networks, etc.

In particular, the use of visual search for identification and similarity is a field with multiple interests, where its commercial applications have been developed over the past decades due to the increase of digital images and video, and the use of Internet with the latest technologies in Smartphone's, tablets, etc., including built in cameras that are more and more advanced.

A first approach to solve the visual search problem was "text-based retrieval", where images are indexed using keywords, tags and classification codes, or subject headings. Limitations associated with related art technologies are two-fold: first, images need to be indexed and labeled, entailing a great deal of time and resources, and second, it is not a standard method, as each user can subjectively interpret, define and describe images in a different way.

An alternative to text-based retrieval is Content Based Image Retrieval (CBIR) technique, which retrieves semantically-relevant images from an image database, based on automatically-derived image features.

Image processing is rather complex; apart from the volume it takes up, there is a real challenge in efficiently translating high-level perceptions into low-level image features, and solving the well-known semantic gap. These technologies may seek to address the following:

Decreasing response time
Increasing accuracy
Simplifying queries for image retrieval
Increasing robustness and invariance to different environments, image capture conditions, and viewpoint changes
Scalability to volume, time, and image nature; to large databases that change and increase in real-time, and flexibility and extendibility to other types of objects, images, and/or patterns.

One of the crucial points for CBIR systems to work properly is the definition and extraction of the image features, i.e. the selection of optimal and appropriate vectors, also called feature descriptors, describing, as completely and accurately as possible, the image or region of interest's visual information, with the minimum amount of necessary data. The purpose of this is to recognize, identify, sort and classify the query image or object of interest, with those identical and similar to it, through efficient search and comparison methods, applied over large image databases.

Technologies of the field developed so far, are commonly based on direct 1:1 comparisons, pattern matching, or correlation methods applied to entire images/objects, or partial image windows/regions of interest (ROI). Such approaches are accurate, and are well-suited to recognize the global structure of specific objects, previously known, and for a limited and trained database, but cannot cope well with partial occlusion, significant changes in viewpoint, or deformable transformations (from K. Grauman and B. Leibe Chapter 3 *Local Features: Detection and Description. Visual Object Recognition. Synthesis Lectures on Artificial Intelligence and Machine Learning*, Morgan & Claypool (2011)). Furthermore, they are usually not robust to illumination changes or noise presence from neighboring elements, making these systems' scalability and flexibility, very costly, and therefore, their CBIR applicability, quite questionable.

Another key factor to define the right CBIR descriptors is that they should be invariant, meaning that they should not be affected by parameters that are sensitive to different image or object capturing conditions and environments, such as illumination, rotation, scale, reversion, translation, affine transformations, and other effects.

Alternatively, there are efforts to develop CBIR systems implementing invariant low-level feature based descriptors to, on one hand, robustly describe images or objects in different capture contexts and conditions, and, on the other, to avoid the use and analysis of high-level features, which are more complex and costly, both in terms of implementation and necessary energy consumption and processing.

The use of these low-level feature vectors, consists of indexing visual properties, using numerical values to describe these features, representing the image or object as a point in an N-dimensional space. This process consists of extracting the query image or object vector features, and applying the metrics and classification methods to analyze similarity in terms of the database.

Currently there are algorithmic methods for extracting this type of invariant features from images, such as Scale-Invariant Feature Transform (or SIFT), G-RIF: Generalized Robust Invariant Feature, SURF: Speeded-Up Robust Features, PCA-SIFT, GLOH, etc. However, these methods describe the concrete, local appearance of objects or image specific regions, selecting a set of points of interest, usually obtained with machine learning and training methods applied over previously known limited databases, meaning that they are not extendable to other objects and categories without corresponding prior training.

In this context, challenges include specifying indexing structures that speed up image retrieval through flexible and scalable methods.

Thus, another alternative to low-level features is the use of descriptors of features such as color, shape, texture, etc., for developing generic vectors, applicable to various sorts of images and objects. Among the optimizing methods for the mentioned vectors/descriptors, the purpose is to obtain the maximum information while including the minimum number of parameters or variables within them. To this end, selection methods are used to determine the most important features and combinations thereof, in order to describe and query items in large databases, reducing the complexity (in terms of both time and computer processing) of search and retrieval, while attempting to maintain high performance accuracy. Moreover, this helps the end users by automatically associating the right features and measurements of a given database (I. Guyon and A. Elisseff. *An Introduction to Variable and Feature Selection.* 2003) Journal of Machine Learning Research 3 (1157-1182)). These methods can be divided into two groups:

Feature transform methods, such as principal component analysis (PCA) statistical procedure and independent component analysis (ICA) computational method, which map the original feature space into the lowest dimensional space, and construct new feature vectors. The problem with feature transform algorithms is their sensitivity to noise, and that the resulting features are meaningless to the user.

Feature selection schemes, robust against noise, and with resulting features highly interpretable. The objective of feature selection is to choose a subset of features to reduce feature vector length while losing the least amount of information. Feature selection schemes, according to their subset evaluation methods, are in turn classified into two groups:

Filtering methods, where the features are evaluated based on their intrinsic effect and natural separation into classes or clusters.

Wrapper methods, which take advantage of learning method accuracy to evaluate feature subsets.

Feature selection in CBIR systems has been achieved so far with different approaches, based on machine learning and training methods, consisting in optimizing accuracy and results for tailored trained specific cases and database samples, which are therefore, not generally extendable to other or new cases and database samples not initially considered and trained, or to different sorts of image and object categories.

Of all these generic feature vectors, color and texture are two of the most relevant descriptors, most commonly used in image and video retrieval. As a result, companies and researchers have gone to great lengths to improve them and base their CBIR systems on them.

Color descriptor or color feature is a global feature that describes the surface properties of the surface of the scene, in terms of images, regions or objects thereof. The different ways to extract color features are explained in Lulu Fan, Zhonghu Yuan, Xiaowei Han, Wenwu Hua *"Overview of Content-Based Image Feature Extraction Methods," International Conference on Computer, Networks and Communication Engineering* (2013).

Different color spaces are widely known for their application in CBIR and their advantages in identifying perceptual colors. No color space can be considered universal, because color can be interpreted and modeled in different ways. With a wide variety of available color spaces (e.g. RGB, CMY, Y IQ, YUV, XY Z, rg, CIE Lab, Luv, HSV, etc.) and a wide variety of descriptors for defining the colors of images and objects, it is not obvious which color space and which features should be measured in order to describe an image and be able to identify those identical and most similar to it. In this context, a question that arises is how to select the color model that offers the best results for a specific computer vision task. These difficulties are explained in detail in (H. Stokman and T. Gevers *"Selection and Fusion of Color Models for Image Feature Detection" IEEE transactions on pattern analysis and machine intelligence*, vol. 29, no. 3, March 2007), where they suggest a generic selection model or models (invariant).

Most of this kind of descriptors, developed to date, have multiple limitations, as reflected in the recent publication by Lulu Fan, Zhonghu Yuan, Xiaowei Han, Wenwu Hua *"Overview of Content-Based Image Feature Extraction Methods," International Conference on Computer, Networks and Communication Engineering.* (2013). The existing color descriptors are not usually able to describe local distributions, spatial localization and region changes in the image, and, in short, are insufficient for unequivocally interpreting, recognizing, classifying and identifying specific complex objects or images, specific high-level patterns, image regions and details, nor finding others which are close or semantically similar. Shape and texture descriptors need complex computational processes, or specific models with prior training.

In summary, there is a key dilemma when it comes to the goals pursued in descriptor selection and extraction for CBIR systems. When robustness, invariance, flexibility and scalability are sought, accuracy loses out. When accuracy is achieved, what is lost is robustness, flexibility and extendibility to other types of images, products or categories.

As a solution to, and evolution of these feature descriptors, the so-called high-level semantic descriptors have arisen, which attempt to interpret visual information in the closest way to our subjective human perception, in order to achieve descriptors that are simultaneously optimal in terms of accuracy, invariance, robustness, flexibility, and scalability, as our brain does when interpreting the visual world around us. However, these descriptors, which aim to get even closer to human intelligence, face barriers due to their algorithmic, computational and storage complexity.

Similarity Analysis

A similarity analysis phase between retrieved image and database is another critical point for CBIR, especially in terms of scalability and processing speed.

This similarity analysis depends largely on the descriptors/vectors type under analysis. The main and most widely used technique is the analysis of the distance between the query image and the rest of the database images, measuring the distance to determine which are identical and similar of those which are not.

Similarity analysis quantifies content similarity between two images. Depending on the type of features, the similarity analysis formulation and its measurement, varies significantly.

The main limitations to the use of distance-based similarity metrics in similarity analysis are:

Scalability, since the greater the number of descriptors, the more similarity metrics systems will have to be run, and the larger the image retrieval, the slower the analysis.

Semantic gap, when low-level features are used that do not adequately represent the whole image or target object, and similarity metrics can miss the real meaning of the image.

To overcome the above limitations of similarity metrics, alternative learning methods have been proposed, based on learning methods combined with similarity analysis, in order to improve similarity searches and achieve scalable CBIR systems. As explained in (G. Rafiee, S. S. Dlay, and W. L. Woo *"A Review of Content-Based Image Retrieval" CSNDSP* 2010 *SIP* 8 (775-779) *de*), there are three common frameworks for establishing a link between image features and a concept: supervised learning, unsupervised learning, and interactive models. The problems with these methods, both the supervised and unsupervised ones alike, is that they require some kind of learning or other, meaning that they cannot ensure accurate behavior for all the possibilities that could arise in unlimited and real-time changing databases, in constant variation and growth.

In summary, despite the many advances made in this technical field, a challenge in CBIR technologies today is still the ability to accurately search for, and recognize, identical and similar images/objects based on descriptors with which to distinguish and measure not only simple low-level shapes, colors and textures, but complex high-level visual information in images, with a wide variety of shapes, geometries, multiple colors and textures, patterns, multi-regions, designs and specific details as our brain does. Furthermore, there is a need for CBIR technologies that are scalable, applicable and extendable to any category, object or image nature, analyzed generically, invariantly and robustly, thus avoiding training over specific predefined and limited database sets. In this way methods may be expandable and scalable to any type of image, object or catalog, and to changes produced in real-time databases, which are often limitless and in constant growth and change. All the more so, given that lack of thorough, object information will always be a factor, as generally its three-dimensional volumetric full data is not captured with single, rather than stereographic, cameras, thus generating two-dimensional digital images with incomplete or partial object information, along with noise and other variations, and moreover achieving only image data from the captured viewpoint and perspective. Finally, it should further be kept in mind that real world objects are generally prone to change, while new or different ones arise within both, a common pre-existing category, as well as new classes and models. As such, said methods should be flexible and ready for such incorporation and evolution over time, in such a way that will not involve the continual re-training, tailoring and readjustment of the used methods.

As such, it is desirable to find alternative methods to training and machine learning techniques used up till now, as their validity is strictly limited to previously known, bounded, and trained databases, whereas at present, scalability and robustness are needed more and more in order to solve the problem of searching for all types of images or objects. In summary, methods are needed that include not only all present search possibilities and conditions, but are also prepared for those that will appear in future, constructing real-time 100% scalable CBIR solutions.

BRIEF DESCRIPTION OF THE INVENTION

This disclosure relates in general to a new CBIR mechanism or system, based on a combination of computer vision systems and statistical methods. Embodiments may address some or all of the limitations identified in the related art, and may provide for improved accuracy, scalability, and/or speed. Embodiments are not required to address any or all of the limitations of the related art described above.

In particular, according to an embodiment, provided is a CBIR, which quickly and accurately finds and searches for identical and similar images/objects, and which is applicable to all categories and types of images or objects of different sorts, consistently and invariantly to any capture condition. As such, embodiment may be extendable, expandable and highly scalable to all types of continually growing and changing catalogues, classes or databases, i.e., 100% real-time scalability may be provided, enabling its use and application through all types of capturing devices, robustly to illumination, view point and other capture conditions.

To this end, an embodiment provides in a first aspect a method for Content Based Image Retrieval comprising:
  selecting a query image;
  segmenting the selected query image by applying a segmentation technique, that may include any necessary previous enhancement and normalization image filtering techniques;
  extracting features from the segmented query image by determining at least two high-level feature descriptors, including color feature descriptors and texture feature descriptors; and
  determining, using the determined at least two feature descriptors of the segmented query image, a similarity of the query image to a plurality of images included in a database, which also include extracted features computed by said at least two feature descriptors.

According to an embodiment, said computed colors and textures (multi-color, multi-texture) feature descriptors include the collective and simultaneous combination of different color spaces, along with their three respective channels, which are also used simultaneously, as well as local and global measurements of the same, all of which may include at least one collective computation of the first order statistics moments, mean and variance simultaneously, measuring +90% representative information of its Gaussian model distribution, thus making it possible to describe not only accuracy in simple low-level region single-color or single-texture features, but also being able to describe high-level features. An embodiment may include different regions with several colors, textures, local distributions, spatial localization, fabrics, weaves, patterns, pictures, designs and/or geometries, and even specific complex objects and precise details. Therefore, an embodiment may provide high-level semantic descriptors with the advantages of low-level ones: simple computing, small size, low implementation complexity, flexibility, robustness, 2D rotation and in most cases maintaining invariance to 3D volume and depth rotation, affine transformations (viewpoint, deformation, etc.), occlusion, reversion, scale and illumination, preferably using a vector with at least 36 numerical values to represent them.

Said colors and textures descriptors may be combined with at least shape/geometry and orientation descriptors, thus providing an advanced shape/geometry and orientation descriptor that is also invariant to 2D rotation, scale, reversion, translation and illumination.

In accordance with another exemplary embodiment, an objective similarity function analysis can be carried out with n-dimensional metrics, preferably using a combination and weighing of Euclidean and/or Mahalanobis distances.

In accordance with another exemplary embodiment, various transformation techniques and filtering methods can be used to select the optimal features and remove redundancy. Preferably, entropic statistical analyses are used avoiding the use of any learning methods or tailored wrappers.

Finally, in accordance with another exemplary embodiment, an analysis and definition of the semantic similarity function may be carried out, based on objective spatial metrics together with subjective weighting, in order to progressively get closer to human subjective perception of visual similarity, without the need of any learning, training or classification methods based on predefined models ("clusters") of the objects/images under analysis. As a nonlimiting example, a real-time hyper-cube may be centered on the query image/object, allowing it to preserve its accuracy alongside scalability.

In accordance with another aspect, an embodiment may provide a computer program product that has code adapted for carrying out the CBIR when it is executed in a computing device, in a digital signal processor, in a specific circuit integrated in a microcontroller, or any other type of data processing system.

BRIEF DESCRIPTION OF THE DRAWINGS

The foregoing advantages, characteristics, and others, may be better understood by referring to the following detailed description, together with the following attached drawings, wherein.

DETAILED DESCRIPTION OF THE INVENTION

Figure 1:
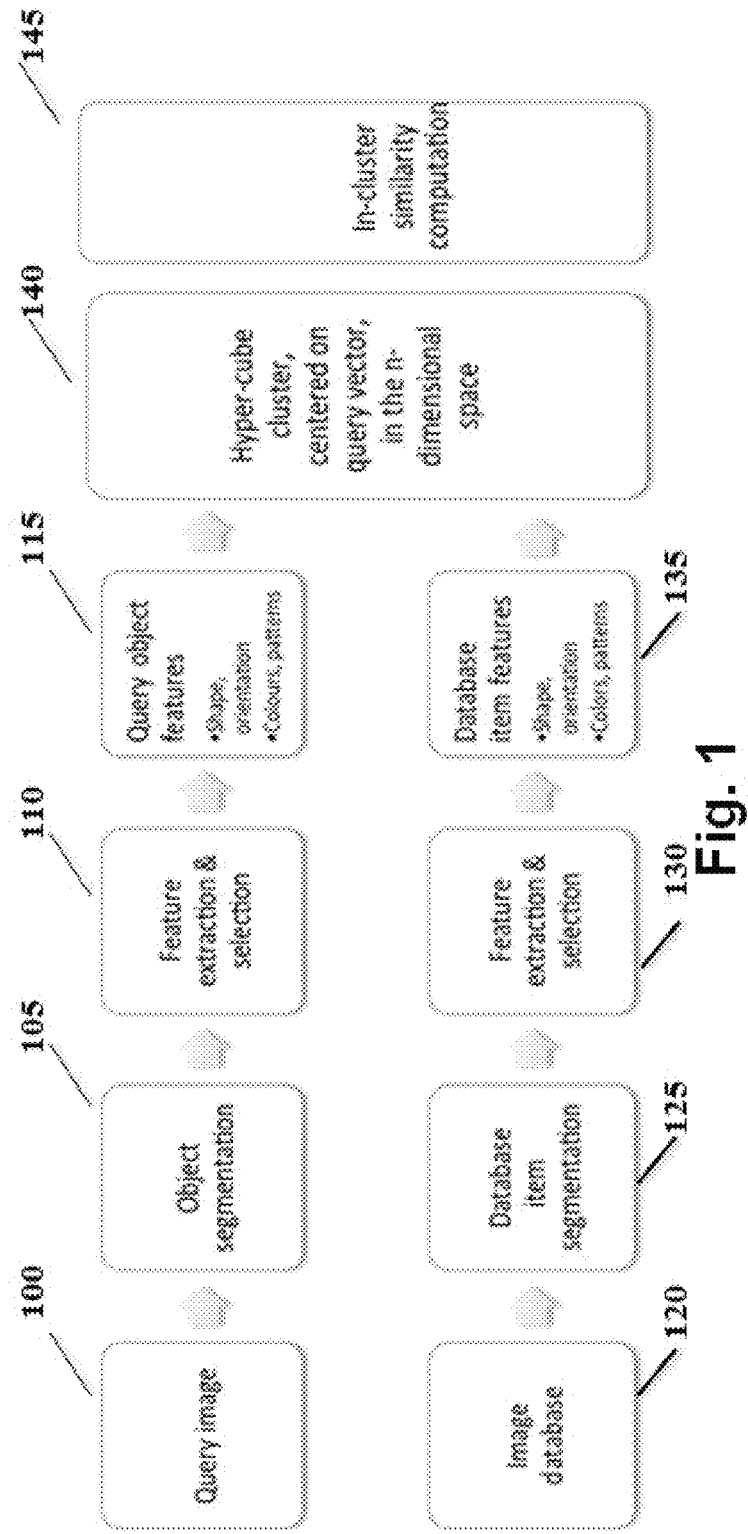
FIG. 1 is a flowchart describing the CBIR proposed method according to an exemplary embodiment.

In FIG. 1, the entire process of the CBIR mechanism is shown, according to an embodiment, and which includes analysis, design and implementation. Said mechanism can be divided into three main stages:

First: image processing and computer vision algorithms for self-defined feature extraction, without the use of wrapper or learning methods.

Second: advanced statistical analysis and qualitative entropic selection and grouping, for optimized evaluation, selection, extraction and compression of the features to include in the planned semantic descriptors.

Third: implementation of the objective similarity function based on Euclidean and/or Mahalanobis distances and, optionally, subjective weighing for human perception.

Image Processing and Computer Vision Algorithms

A generic and scalable method is provided according to an embodiment, with the aim of making it applicable and extendable to all types of images, objects or Regions of Interest (ROI), using detection, segmentation and recognition, thus preserving the flexibility, interoperability and scalability of the system at all times.

First, referring to FIG. 1, a query image is input in block 100, then segmentation (preferably also previous enhancement and normalization) are performed in block 105 using known state of the art techniques. Next, for feature extraction in block 110, descriptors for initial local/global features are computed (preferably shape, orientation, colors and textures), and then stored as query object features in block 115. The descriptors identify the most invariant and non-correlated variables of the segmented query image, based on image transform methods, as well as those that best represent and describe the visual information target features. The first approach is to optimize invariance to scale, illumination, rotation, translation and reversion. The second approach is to provide the maximum information using the least data for each descriptor. For shape, mathematical geometry variables are extracted, to describe both local and global shape, including: invariant statistical moments, eccentricities, convexities, areas, perimeters, and relationships ratios thereof, etc., up to a total of approximately 20-30 variables and measurements, initially included in the descriptor. For orientation, PCA computation is included, along with other ratios based on object hull shapes. For colors and textures, several statistical moments are also defined, both global and local measurements, including at least mean and variance (standard deviation) for various illumination invariant color spaces, all of which take place simultaneously, again up to approximately 20-30 variables.

Shape feature descriptor extraction involves measuring all geometric invariant transformed features that can efficiently contribute to shape description, both for low- and high-level descriptions.

Referring back to FIG. 1, for each of a plurality of images included in the database provided in block 120, the image is segmented in block 125, as discussed above with respect to object segmentation in block 105.

Next, feature extraction is performed in block 130 and then descriptors are stored as database item features in block 135, as discussed above with respect to blocks 110 and 115.

In order to measure the most significant and faithful possible replica of the real world, and bearing in mind that physical/3D objects are projected to 2D digital image representations, and, therefore a large portion of the core information about the object is lost, parameters are sought with the aim of preserving invariance to 3D-rotation as much as possible, as well as to reversion and flipping. Therefore, low-level invariant Hu moments are used at the global outset, along with other linear and dimensionless parameters related to the object's volume, based on convex hulls, eccentricities, other derivate computed shapes, and ratios thereof related to the object.

For inside contours and other high-level features, equivalent perimeter-based ratios and detailed local inside shapes and geometries measurements are used. For inside and outside borders, convexities, eccentricities, etc., convexity defect and inbound areas and related linear ratios are computed.

For orientation descriptor extraction, the invention relies on the first PCA component angle value, and/or other related angle ratio computations, such as the length of enclosing rectangle length vs. height ratios, among other geometric shapes, angles and ratios.

Together, shape and orientation initial feature extraction preferably makes up a total of 35 variables.

To extract the colors and textures feature descriptors, transformed features are computed, which can efficiently describe multiple colors, multiple textures, local and global regions, high-level patterns and weaves features within objects, preserving high robustness and invariance to illumination and color changes, that can be present not only due to different image capture conditions, but also due to 3D to 2D projection, including shades and shines effects, volume perspective changes, etc. The embodiment works with several different color spaces: at least HSV, CieLAB and CieXYZ, because of their suitable attributes for perception, based on color and illumination invariance, and to compensate color feature limitations when using single color spaces (HSV for instance is not good to measure whites and blacks values).

Moreover, with the purpose of measuring not only global colors and textures features, but also high-level local ones, and therefore including spatial-local measurements in the same descriptor, main statistical moments can also be measured for the entire object area, as well as for smaller local ROIs. To measure colors and textures representations in this way, global statistical moments are computed, including at least mean and variance for the three invariant color spaces, wherein it is easier to measure predominant colors/patterns (with the mean) and predominant textures/weaves (with the variance). With the purpose of likewise being able to distinguish different color/texture regions in a single object, small local specific ROIs can also be included in the whole object image, with at least mean and variance values close and/or far to global values, measured by means of Euclidean distances.

The chosen ROI in this exemplary embodiment is made up of 1% of the total object's area, and is the one, chosen from the entire object/image that satisfies the closest distance from its local statistics values to the global ones, i.e. the distance (ROI, Object) is:

$$\min\{\text{distance}([\mu_{ROI}, \sigma_{ROI}], [\mu_{object}, \sigma_{object}])\}$$
$$=\min[\sqrt{(\mu_{ROI}-\mu_{object})^2+(\sigma_{ROI}-\sigma_{object})^2}]$$

Together, colors and textures initial feature extraction makes up a total of at least 18 variables.

Statistical Multi-Variant Analysis and Methods for Optimized Feature Compression and Selection Once the variable extracted initial features to include in the vector descriptor have been obtained, they are thoroughly analyzed in statistical and entropic terms in order to obtain the most uncorrelated, useful and optimized theoretical data to be selected, with the purpose of deciding which variables constitute to the proper feature description, and eliminating those that do not provide visual information, but rather noise, or redundant data. Moreover, the purpose is to avoid training a particular set of images or items for defined clusters or models, as the basic premise of these generic descriptors is always that they have to describe any type of object from within any type of category and nature.

From first feature descriptors statistical advanced multi-variant analysis and results, the following conclusions were drawn:

For orientation and shape feature descriptors, 99.61% of the entropic non-correlated visual information data is reached using the defined variables. This means that it is possible to thoroughly measure and describe objects in terms of their external shape and orientation features, based on this descriptor thus defined.

For colors and textures feature descriptors, 98.92% entropy percentage is reached, whereby it may also be considered to offer a thorough description of, at the least, patterns/colors and weaves/textures of two present different regions, for all types of objects or regions of interest described.

Once said vectors have been entropically and stochastically analyzed, a qualitative analysis is carried out, for further compression and feature semantic description.

For shape and orientation descriptors, independent qualitative features, based on the resulting statistical independent factors and their qualitative interpretation, were: volume, orientation, inbounds and convexities. Whereas volume and orientation are global features, inbounds and convexities are local features, enriching the overall descriptor in terms of both accuracy and flexibility, by combining both global and local descriptions within the same descriptor vector. Thus, in terms of human perception and statistical visual information, the original descriptors can be conceived as two independent ones: orientation and overall geometric shape (global and local).

For the colors and textures descriptors, the independent qualitative extracted features were: colors, textures, patterns, and weaves/details. In this case, it should be noted that, whereas colors and textures are global features, patterns, weaves, geometric designs and specific details are local ones. Moreover, given its global/local balance and the multiple color spaces simultaneous presence, it is possible to recognize multi-regions, i.e. more than one color, texture or pattern in the same image or object. For human semantic perception, original descriptors may be divided into several: colors/patterns and weaves/details (including textures, and complex visual information).

For this reason, from this stage it can be inferred that original descriptors may be broken down into other independent feature descriptors and, as such, may be processed separately so as to improve visual semantic accuracy, based on subjective human perception and description, or used for independent selection for other user purposes and applications. Moreover, based on other statistical analysis achieved and on the reduction of redundant information using several methods, the following results are obtained:

An advanced high-level semantic descriptor for describing shape, geometry and orientation, made up preferably of 22 variables (not limitative, as the value for describing the advanced high-level semantic descriptor does not lie in this exact number of variables but in conceptually what altogether these number of variables measure), which is robust, invariant and accurate, thus improving the interpretation and initial description obtained from the original 35 features.

An advanced high-level semantic descriptor for describing colors, textures, patterns, weaves, geometric designs and details, made up of preferably 36 variables (again not limitative), which is robust, invariant and accurate, thus improving the expected interpretation and initial description, and without the need for any specific subjective semantic clustering.

This compression and accuracy description for these high-level descriptors may be improved, so that the preferred 22 and 36 variables values may be reduced if they are more compressed or may increase if new variables are included to provide further information.

Figure 2A:
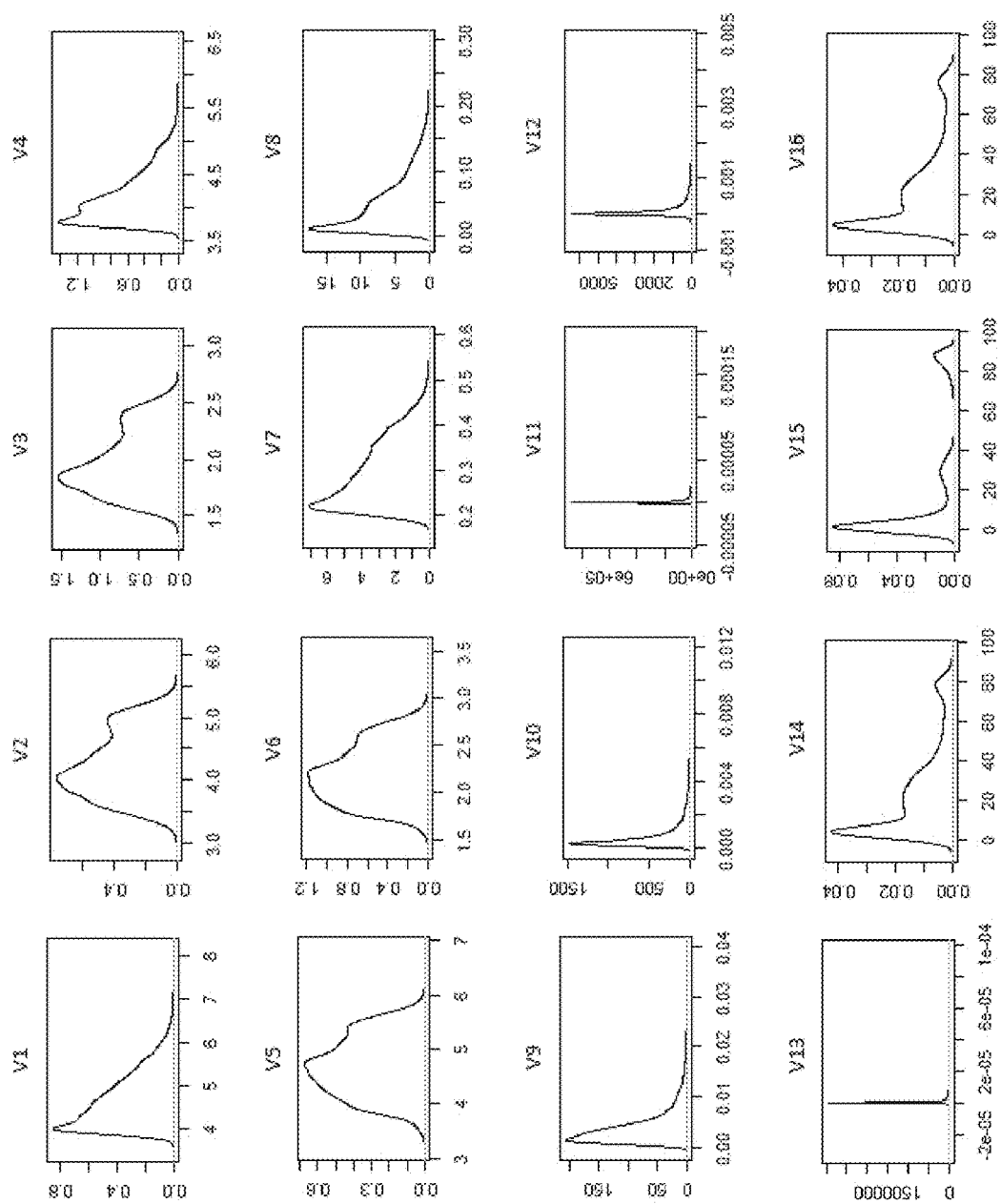
FIG. 2a illustrates examples obtained from the feature descriptor vector, variable density functions for shape and orientation.
Figure 2B:
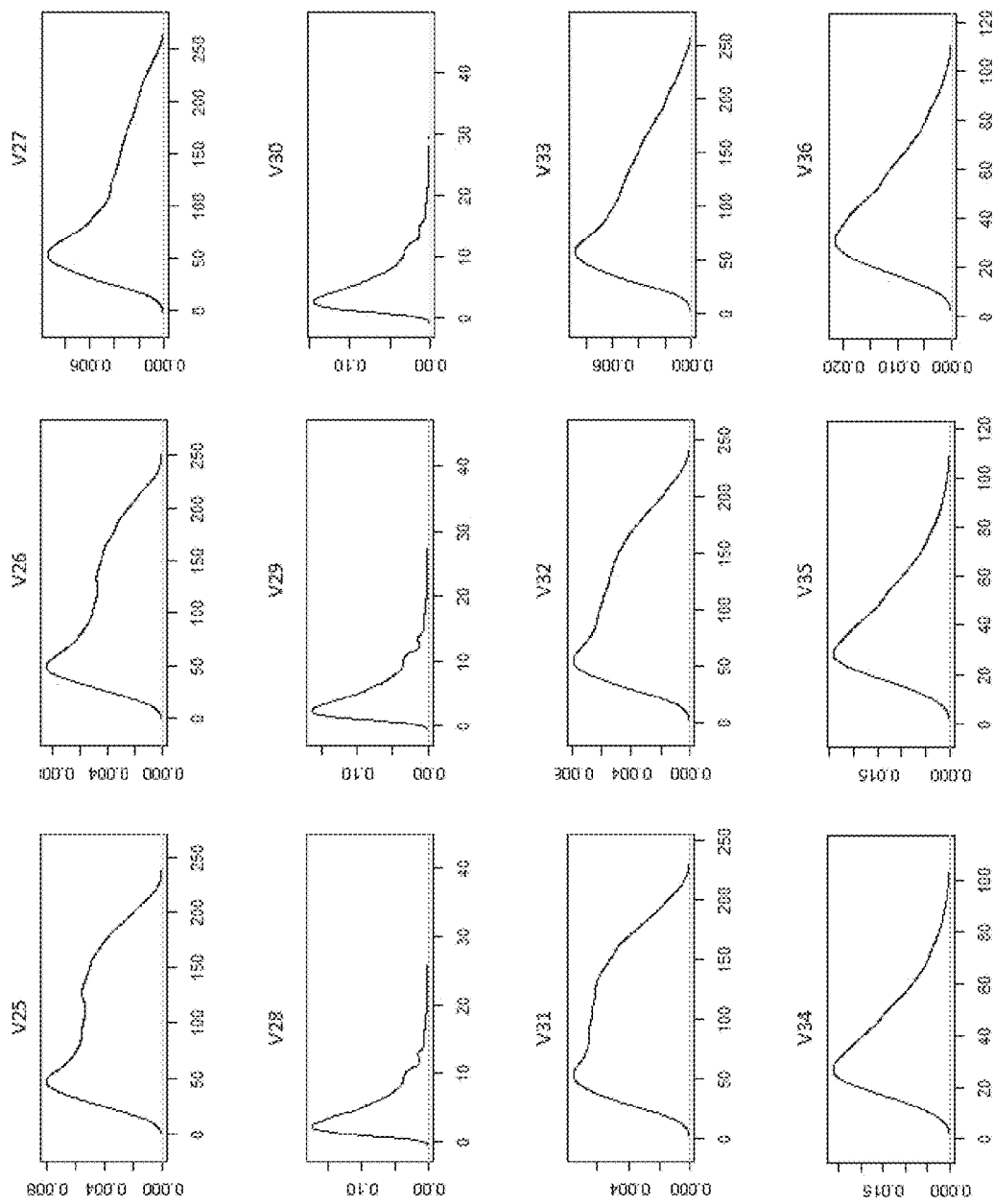
FIG. 2b illustrates examples obtained from the feature variable density functions for colors and textures.

Referring to FIG. 2 are shown examples. FIG. 2a illustrates examples obtained from the feature descriptor vector, variable density functions for shape and orientation and FIG. 2b illustrates examples obtained from the feature variable density functions for colors and textures.

Defining the Scalable Similarity Function

As previously indicated, accuracy is one of the main problems affecting related art similarity-induced semantics CBIR systems. This is due to the difference between high-level concepts perceived by human brain, and the low-level descriptors frequently used in related art systems. Furthermore, due to the use of space metrics and distances, and to the mathematical reduction of an n-dimensional information space to one that is variable and one-dimensional (distance), for the purpose of sorting the most similar results to the query image, it frequently happens that many results that are partially or totally non-similar in semantic terms, get in the way of the most similar ones from an objective and mathematical distance point of view, generating "noise" between the most human-perceived similar results. This is because, although in terms of low-level mathematical computation they are all, objectively, the closest to one another, from the high-level human subjective perception, they are not perceived as the most similar.

In addition, when computing 1:1 distances between the query image and each image in the database image set, scalability does not grow constant, but rather linearly, due to the increase in the 1:1 combinations to be performed. As a result, retrieving images from large databases becomes a problem in terms of speed limitation and computational processing. This is usually solved by means of machine learning trained wrapper methods, classifying and modeling into predefined clusters, and only performing 1:1 distance computations on the query image with respect to each class or cluster respective centroid. However, in such cases that classification into clusters may define said specific set in a fixed tailored manner, optimized using training wrapper methods, and so, once again, it may only be valid for a specific previously known database or limited set. Moreover, in such cases accuracy is negatively affected, as classification errors are more likely, since the entire universe of cases must be grouped into clusters. This means that central models alone are used to represent a wide and generally disparate variety of cases and points of the n-dimensional universe, some of which are often not correctly classified into the most representative cluster. For this reason, for real-time limitless and continuously growing database sets, these classification methods may not be valid, as they have to be continuously updated and retrained to maintain expected accuracy levels, which will however likewise decrease, thus generating additional costs and tasks, and preventing total constant speed, accuracy and scalability.

To address some or all the above-mentioned limitations, a new similarity function is provided according to an embodiment, which is based neither on predefined classification methods, nor on space metrics systems optimized through machine learning, but rather on four main pillars:

Similarity analysis based on at least 4 high-level semantic descriptors with combined global and local features.

Real-time creation of a "personalized subset cluster" based on tailored hyper-cube computation and hyper-planes hierarchical space segmentation. Centered on the query image's position in n-dimensional space, and computing only 1:1 distances for items inside this set, in order to increase the search speed (which is applied only inside said space) and enable scalability for large-scale and/or real-time continuously changing and growing databases.

Referring back to FIG. 1, after storing the query object features in block 115 and the database item features in block 135, a hyper-cube cluster, centered on the query vector in n-dimensional space, is determined in block 140, and in-cluster similarity computation is performed in block 145.

Figure 3A:
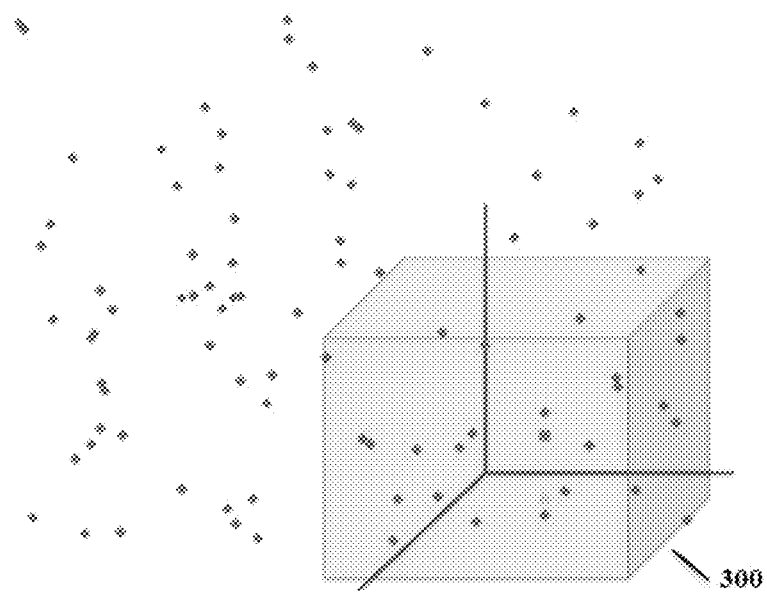
FIG. 3a illustrates a tailored hyper-cube cluster 300.

FIG. 3a illustrates a tailored hyper-cube cluster 300. In this case, the hyper-cube cluster 300 is defined by a vector with an m-dimensional radius, where m is a subset of the total n-dimensions of all the descriptors' variables/dimensions together, with independent and different radius values for each dimension computed with hyper-planes, and based on an accepted distance percentage of the value of the query image position, limited as well by the computation of the maximum speed permitted in order to compute the linear necessary 1:1 distances within the hyper-cube cluster and spatial density of the samples, with respect to the local query position in the n-dimensional space.

Similarity classification within the tailored hyper-cube subset, based on combined Mahalanobis and/or Euclidean distances, is independently applied to each semantic feature descriptor separately, and subsequently weighted in terms of subjective visual similarity, non-linear with at least 2-order, function:

$$\text{Similarity} = \alpha^2 \cdot [[d]_{mah}(\text{orientation+shape})]^2 + \alpha \cdot [[d]_{mah}(\text{orientation+shape})] + (1-\alpha)^2 \cdot [[d]_{mah}(\text{patterns+weaves})]^2 + (1-\alpha) \cdot [[d]_{mah}(\text{patterns+weaves})] + K$$

where
$\alpha = W_{shape}$
$1-\alpha = W_{weaves}$

These matrices are standard for any object and category description, as they represent the inter-correlation between the variables within each descriptor, where they are independent of the object and category type they describe. Due to this, scalability is possible, as far as algorithms are concerned.

To compute α, an initial supervised learning method is applied (note that only a learning method may be applied at this point only to tailor the subjective human perception weighing, and not before, when defining the objective, generic and non-trained feature descriptors), which is supported by a multi-variant logistic regression to suit human visual perception, based on two criteria:

α|Maximizing the sort position of the similarity function for results identical to the query image α|Minimizing perceived invariance in the resulting subjective semantic similarity function sort To improve the present colors and textures descriptors, an embodiment allows for the inclusion of new additional color spaces (e.g. RGB, CMYK, other CIEs, etc.), computation of additional higher-order statistical moments (e.g. covariance, correlation, skewness, Kurtosis, etc.), additional computation of spatial simultaneous and multi-size ROIs (e.g. ROI 50%, ROI 25%, 10%), multi-shape ROIs (e.g., triangular, hexagonal, etc.) and other relatedness and nearness dependencies (e.g. nearest, farthest, middle with respect to global values).

Furthermore, in order to show the benefits of an embodiment in terms of estimated scalability requirements, among others, detailed statistical tests have been carried out to prove the required invariance, speed, robustness and accuracy properties.

Tests and Examples Carried Out

Figure 3B:
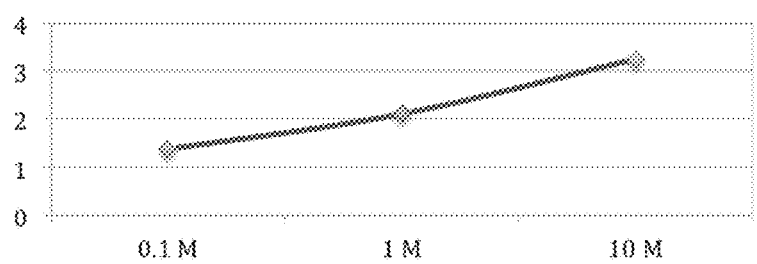
FIG. 3b illustrates an example of resulting timings in seconds, for query-searches through 0.01.M, 1M and 10M items databases sizes, defined according to an exemplary embodiment.
Figure 3C:
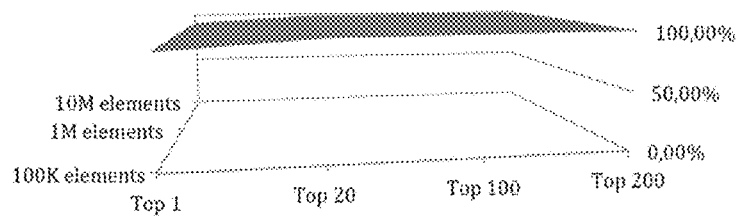
FIG. 3c illustrates an example of resulting accuracy results in % of the percentage of appearance in first position (Top 1), 20th position (Top 20), etc, of all query images searched, for query-searches through 0.01.M, 1M and 10M items databases sizes, defined according to an exemplary embodiment.

In terms of speed and timings with the biggest database tested, having 10 million images, an average time of 3.25 seconds per query was reached. With 1 million images, an average time of about 2.11 seconds per query was reached, and for only 100,000 images, an average time of 1.37 seconds per query was reached. With only three sample points and an estimated initial extrapolation, as shown in FIG. 3b, the scaling, as illustrated by line 310, is very good and near the theoretical limit of logarithmic growth, log N for optimally indexed searches in N products, thus appearing linear in the logarithm of the database size. (Note that the x axis in FIG. 3c shows the number of images in the database, and the y axis shows the number of seconds per query.)

It can be observed that while a complete 1:N sorting of the results can be expected to grow as N log N, it can be compensated with a corresponding growth in the number of machines, and moreover optimized when including the search over the real-time hyper-cube cluster subset of the total database, that can contain even up to 50,000 images and still provide query searches inside it requiring less than 0.5 seconds/search.

In terms of accuracy, the maximum entropic data reached by each descriptor was measured:

Orientation and Shape Feature Vector (15 Variables Selected)

===Summary===

| Correctly classified instances | 99.6129% |
|---|---|
| Incorrectly classified instances | 0.3871% |
| Kappa statistic | 0.9956 |
| Mean absolute error | 0.0012 |
| Root mean squared error | 0.0241 |
| Relative absolute error | 0.6564% |
| Root relative squared error | 8.1031% |
| Coverage of cases (0.95 level) | 100% |
| Mean relative region size (0.95 level) | 10.2194% |

Colors, Textures, Colors and Textures Feature Vector (36 Variables Selected)

===Summary===

| Correctly classified instances | 98.9204% |
|---|---|
| Incorrectly classified instances | 1.0796% |
| Kappa statistic | 0.974 |
| Mean absolute error | 0.0053 |
| Root mean squared error | 0.0516 |
| Relative absolute error | 3.5393% |
| Root relative squared error | 18.8267% |

-continued

| Coverage of cases (0.95 level) | 100% |
|---|---|
| Mean relative region size (0.95 level) | 9.1797% |

The optimal α was computed for the similarity function in order to optimize:
higher % of appearance of query object in the first results
maximum uniformity in subjective human perception similarity for the results of a query object In terms of hit rates %, different tests are performed to measure the robustness to scale, rotation, reversion, scalability, deformations, occlusion and illumination effects:

For a random subset of 1033 elements, with a similarity function (all descriptors included: pattern, weave, shape and orientation), tested on more than 112 subsets of samples in reduced scale (50% of the original image)
TOP 1: 94.64%
TOP 2: 97.32%
TOP 3: 97.32%
TOP 4: 97.32%
TOP 5: 97.32%
TOP 6: 97.32%
TOP 7: 97.32%
TOP 8: 97.32%
TOP 9: 97.32%
TOP 10: 97.32%

For a random subset of 1033 elements, with a similarity function (all descriptors included: pattern, weave, shape and orientation), tested on more than 112 subsets of samples in reduced scale (25% of the original image)
TOP 1: 93.75%
TOP 2: 94.64%
TOP 3: 94.64%
TOP 4: 95.54%
TOP 5: 95.54%
TOP 6: 95.54%
TOP 7: 95.54%
TOP 8: 96.43%
TOP 9: 96.43%
TOP 10: 96.43%

The CBIR according to an embodiment is robust to scale reduction variance, in spite of the digital downsampling loss effect. Moreover, applying same tests (25% scale downsampling) to bigger databases:

| | 100K images | 1M images | 10M images |
|---|---|---|---|
| Top 1 | 90% | 91% | 91% |
| Top 20 | 98% | 98% | 98% |
| Top 100 | 99% | 99% | 99% |
| Top 200 | 100% | 100% | 99% |

It can observed that there is not an increase in noise and false positives; the percentage of correct images entering the Top 20 and Top 100 is fairly independent of the database volume increase scalability and only some competition for the top result is observed.

For a random subset of 1033 elements, with a similarity function (all descriptors included: pattern, weave, shape and orientation) tested on more than 112 subsets of samples in different views (image reverse and 2D rotation, etc.)
TOP 1: 90.18%
TOP 2: 91.07%
TOP 3: 92.86%
TOP 4: 94.64%

TOP 5: 94.64%
TOP 6: 95.54%
TOP 7: 95.54%
TOP 8: 95.54%
TOP 9: 95.54%
TOP 10: 95.54%

For a random subset of 1033 elements, only with colors and textures descriptors, tested on more than 112 subsets of samples in different views (image reversed/flipped, 2D rotated, etc.)
TOP 1: 76.22%
TOP 2: 81.10%
TOP 3: 82.93%
TOP 4: 85.98%
TOP 5: 86.59%
TOP 6: 89.63%
TOP 7: 92.07%
TOP 8: 92.68%
TOP 9: 93.29%
TOP 10: 93.29%

For a random subset of 1033 elements, only with shape and orientation descriptors, tested on more than 112 subsets of samples in different angles of orientation (image reversed/flipped, rotated in 2D)
TOP 1: 75.89%
TOP 2: 82.14%
TOP 3: 83.93%
TOP 4: 85.71%
TOP 5: 86.61%
TOP 6: 87.50%
TOP 7: 88.39%
TOP 8: 88.39%
TOP 9: 88.39%
TOP 10: 88.39%

It can be concluded that all features contribute to global similarity accuracy, and have a similar initial accuracy for finding the identical object in the first result, although the colors and textures features are clearly stronger, as the hit rate percentage increases 22% from the top 1 to the top 10, whereas for shape and orientation the increase is 16%.

The hit rate percentage was also computed for other query image conditions, in order to verify accuracy robustness and flexibility to scale 3D depth rotation and taking into consideration descriptors are only being computed to single 2D images which have a different view-point, thus different visual information.

For a random subset of 1033 elements, with a similarity function (all descriptors included: pattern, weave, shape and orientation), tested on more than 112 subsets of samples for a 3D depth rotated view.
TOP 1: 25.00%
TOP 2: 33.93%
TOP 3: 39.29%
TOP 4: 44.64%
TOP 5: 46.43%
TOP 6: 48.21%
TOP 7: 49.11%
TOP 8: 51.79%
TOP 9: 54.46%
TOP 10: 54.46%

As expected and only computing 2D descriptors, the CBIR according to an embodiment may not initially be as strong to 3D depth rotation variance as desired, due to affine distortion. However, it is a good first step if in the first 10 results, approximately half of the cases are suitably identified from this view. To improve this variance in 3D depth, according to another embodiment, new actions are carried out, including incorporating descriptors and the evolution thereof, over additional 2D views from the full 3D object.

In summary, according to an embodiment, provided is a new CBIR method that is faster, more accurate and more scalable, due to the following reasons:

Self-selection of what appears at first to be low-level descriptors, in terms of their computational simplicity and small vector dimension size, but which are invariant, robust, flexible and scalable due to their implementation through transform methods, and which preserve their original intrinsic effect, without applying inducement or forced training methods, thus preserving extendibility and scalability, and, in turn, high performance with any type of retrieved object, category or image.

Application of transform techniques and filtering methods for selecting optimal features and eliminating redundancy, through entropic statistical analysis, thus avoiding the use of learning or wrapper methods.

High-level obtained feature descriptors in terms of their accuracy to detailed visual information, and their complexity to simultaneous combination and description of global and local features, capable of precisely and efficiently recognizing things that are much more complex and detailed than what they would initially appear to describe, achieving high hit rates that make it possible to directly and simply interpret near human-like semantic concepts.

Analysis and similarity function with n-dimensional metrics, using combined Euclidean and/or Mahalanobis distances, with, optionally, later subjective weighing for human perception tailoring. Increased efficiency and speed, due to the improvement brought through the optimized implementation of the real-time hyper-cube centered on the query image.

FIGS. 4, 5, 6, 7a, 7b, 7c, 7d, 8a, and 8b, show various visual examples obtained through various embodiments for different types of selected images. It should be noted that the examples in this application have been illustrated in grayscale, although the original color of these examples is in color, wherein it is easier to interpret and observe the different results and their accuracy.

Figure 4:
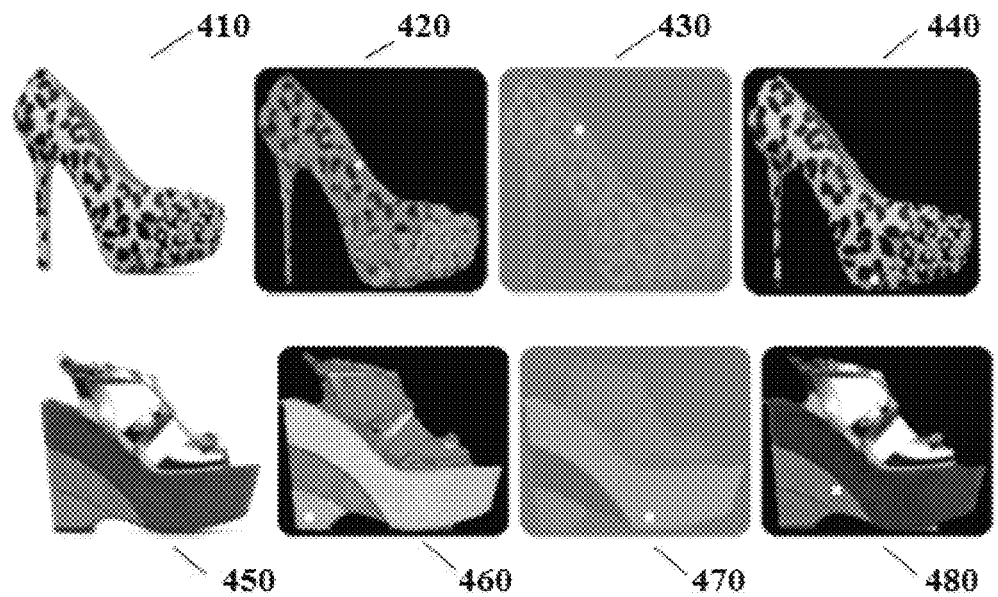
FIG. 4, illustrates an example of the resulting different color information provided and positions of the local ROI, of the color and texture feature descriptor vectors, according to the different color-channels used in said feature descriptor.

FIG. 4 illustrates examples 410, 420, 430, 440, 450, 460, 470, and 480 of the information measured through the feature descriptors with the simultaneity of color spaces and the presence of global and local measurements (local measurements applied to a square ROI).

Figure 5:
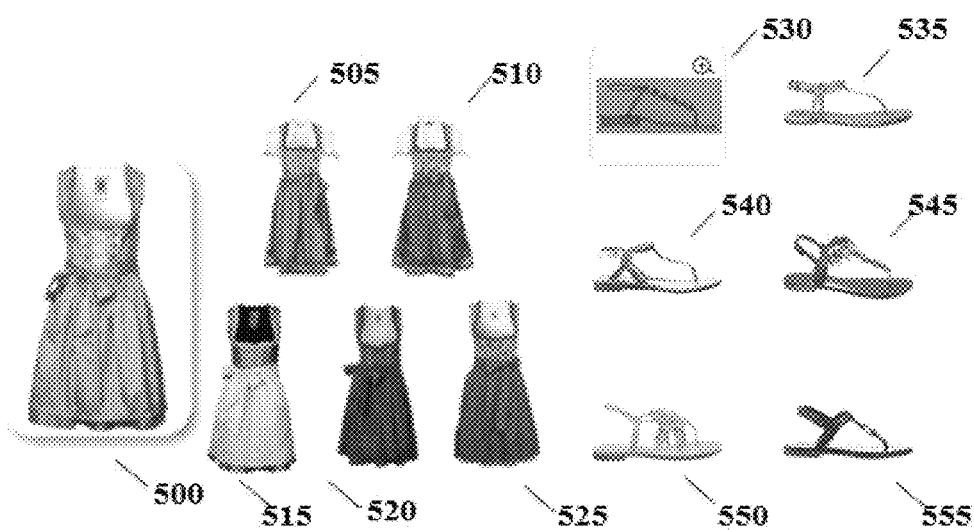
FIGS. 5, 6, are visual examples obtained with various exemplary embodiments, using all together color, texture, shape and geometry feature descriptors.
Figure 6:
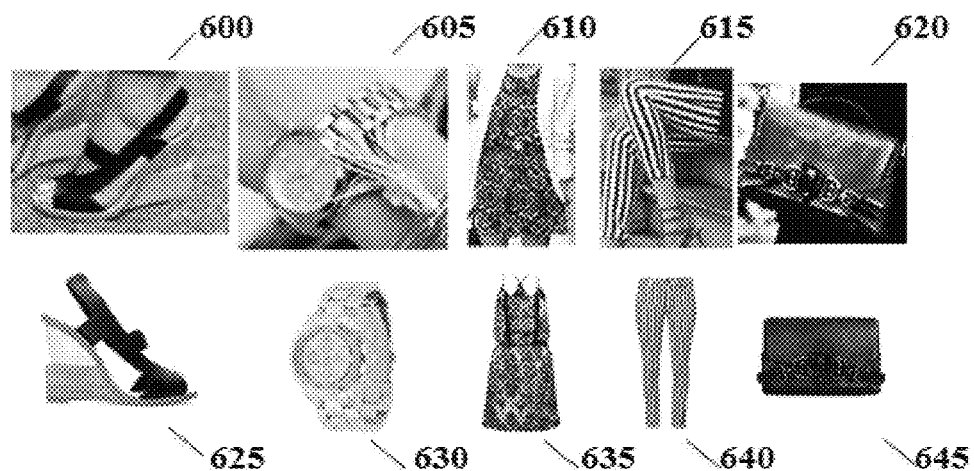

FIGS. 5 and 6 illustrate examples 500, 505, 510, 515, 520, 525, 530, 535, 540, 545, 550, 555, 600, 605, 610, 615, 620, 625, 630, 635, 640, and 645 of the results obtained with the complete CBIR solution and different query image conditions (catalogue images, real snapshots and a handmade drawing), demonstrating the accuracy, scalability and flexibility, along with robustness to noise, illumination changes, and invariance to rotation, reversion, translation, occlusion and scale.

Figure 7A:
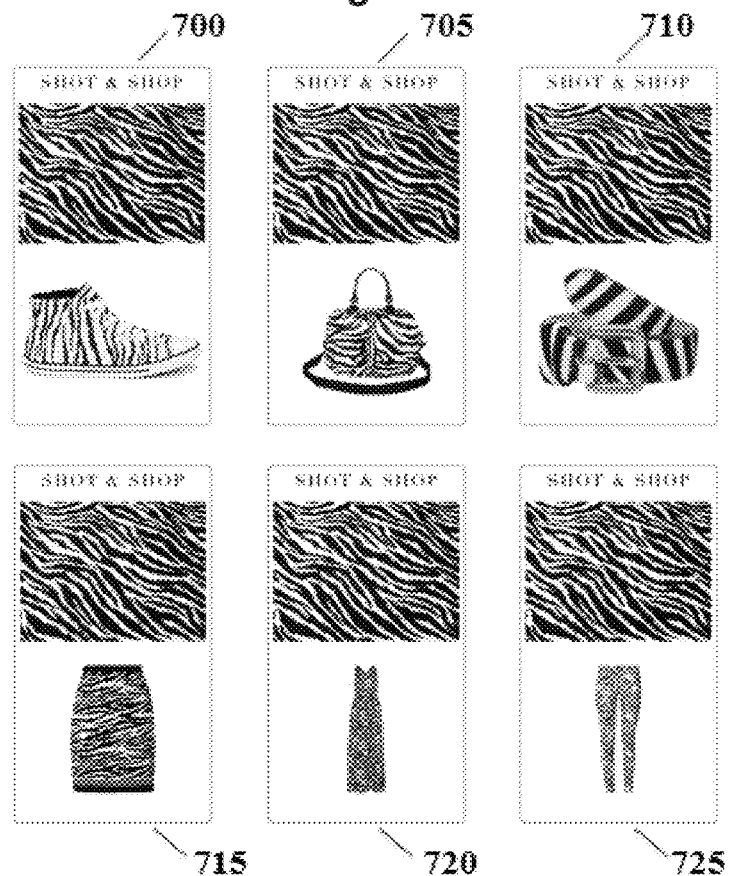
FIGS. 7a, 7b, and 7c are visual examples obtained with various exemplary embodiments, using only color and texture feature descriptors (i.e. shape and geometry is not measured in these cases), showing its high-level patterns and weave's similarity recognition capabilities.
Figure 7B:
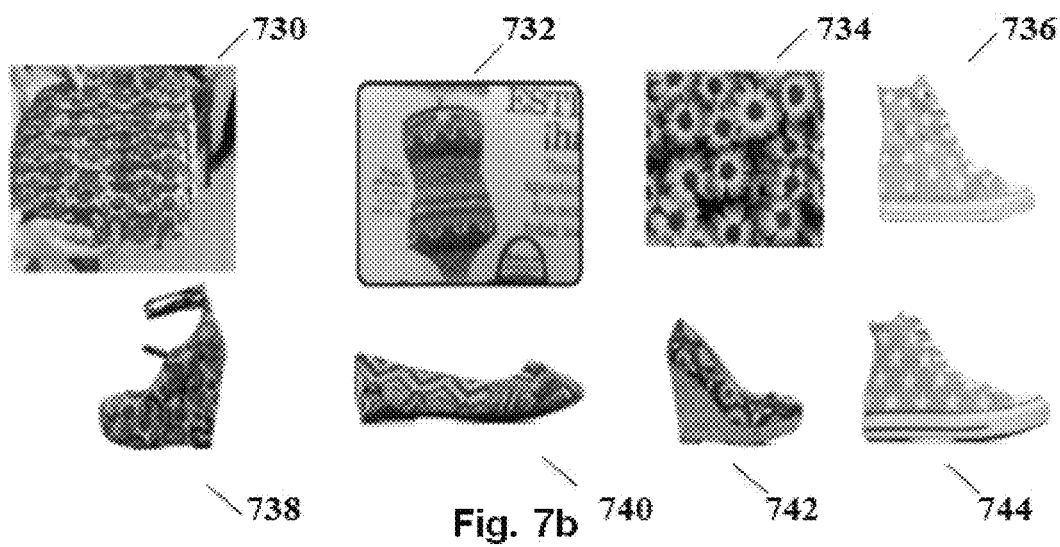
Figure 7C:

FIGS. 7a, 7b, 7c illustrates examples 700, 705, 710, 715, 720, 725, 730, 732, 734, 736, 738, 740, 742, 744, 750, 755, 760, 765, 770, and 775 obtained using only color and texture feature descriptors, showing its high-level patterns and weave's similarity recognition capabilities, i.e. analyzing patterns, specific details like flowers, studs, dots, buckles, geometric designs, multi-regions with different colors and textures, while maintaining proportions, stripes, checks, stars.

Figure 7D:
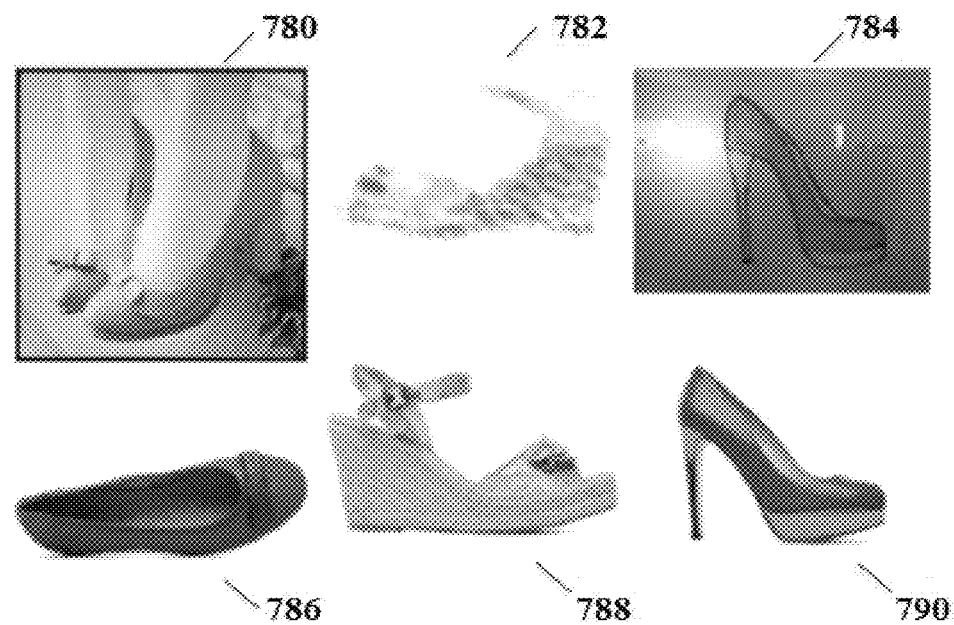
FIG. 7d are visual examples obtained with various exemplary embodiments, using all together color, texture, shape and geometry feature descriptors, showing flexibility to viewpoint 3D rotation, and robustness to illumination changes and different image conditions with drawings in paper, glass, etc.

FIG. 7d illustrate examples 780, 782, 784, 786, 788, and 790 obtained using all together color, texture, shape and geometry feature descriptors, showing flexibility to viewpoint 3D rotation, and robustness to illumination changes and different image conditions with drawings in paper, glass, etc.

Figure 8A:
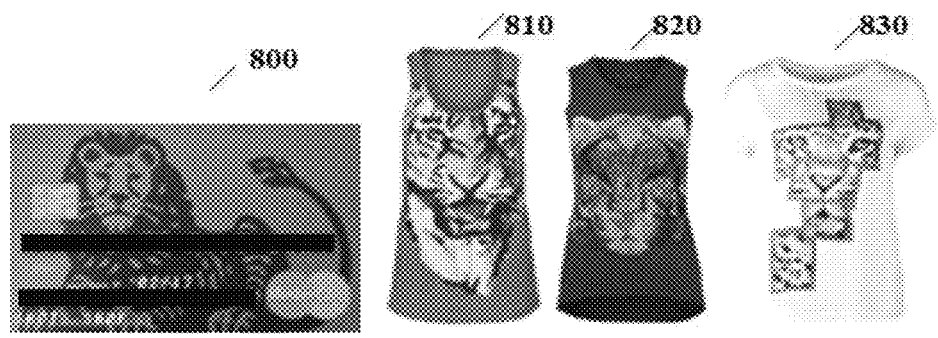
FIGS. 8a, and 8b are visual examples obtained with various exemplary embodiments, using only color and texture feature descriptors (i.e. shape and geometry is not measured in these cases), showing its flexibility to different images nature simultaneously to its high-level complex details similarity recognition capabilities, finding even animal faces in different contexts.
Figure 8B:

Finally, FIGS. 8a, and 8b illustrate examples 800, 810, 820, 830, 840, 850, and 860 of the scalability of the system according to an embodiment, using only color and texture feature descriptors, where the same feature descriptors are used to interpret not only objects from the same category, but also objects from other categories, recognizing and describing, in detail and semantically, the visual information in the search to even recognize animal faces.

The foregoing detailed description has set forth various embodiments via the use of block diagrams, schematics, and examples. Insofar as such block diagrams, schematics, and examples contain one or more functions and/or operations, each function and/or operation within such block diagrams, flowcharts, or examples can be implemented, individually and/or collectively, by a wide range of hardware, software, or virtually any combination thereof, including software running on a general purpose computer or in the form of a specialized hardware.

The term "computer-readable storage medium" as used herein refers to any tangible medium, such as a disk or semiconductor memory, that participates in providing instructions to a processor for execution. A general purpose computer may be connected to a storage device such as a hard drive, optical media (CD or DVD), disk media, or any other tangible medium from which the general purpose computer can read executable code.

While certain embodiments have been described, these embodiments have been presented by way of example only, and are not intended to limit the scope of the protection. Indeed, the novel methods and apparatuses described herein may be embodied in a variety of other forms. Furthermore, various omissions, substitutions and changes in the form of the methods and systems described herein may be made without departing from the spirit of the protection. The accompanying claims and their equivalents are intended to cover such forms or modifications as would fall within the scope and spirit of the protection.

The invention claimed is:

1. A method for content based image retrieval, the method comprising:
    selecting a query image;
    segmenting the selected image by applying a segmentation technique;
    extracting features from the segmented image by determining at least two feature descriptors, including a color feature descriptor and a texture feature descriptor; and determining, using the determined at least two feature descriptors of the segmented query image, a similarity of the query image to a plurality of images included in a database, which also include features extracted and computed by said at least two descriptors, the method being characterized in that the determined color feature descriptor and texture feature descriptor comprise global and local statistical measurements of at least the mean and variance of the numerical values for each of three color channels of each one of at least three different color spaces.

2. The method according to claim 1, wherein the color feature descriptor and texture feature descriptor are further combined with at least a shape feature descriptor and an orientation feature descriptor.

3. The method according to claim 1, wherein the determined color feature descriptor and texture feature descriptor may comprise only global statistical measurements of at least the mean and variance of the numerical values for each of three color channels of each one of at least three different color spaces.

4. The method according to claim 1, further comprising, computing a local region of interest, or ROI, of a certain ROI size within the query image in order to distinguish different color and/or texture regions in the query image, wherein the ROI is computed by measuring mean and variance, where the ROI satisfies a distance nearest or farthest to the global statistical measurements.

5. The method according to claim 4, wherein the ROI size is a percentage of a total area of the query image.

6. The method according to claim 1, wherein the different color spaces combined simultaneously comprise at least HSV, CieLAB and CieXYZ.

7. The method according to claim 2, wherein the shape feature descriptor comprises using low-level invariant Hu moments and other non-linear and dimensionless parameters related to a volume of an object, based on areas comprising convex hulls, eccentricities, other derivate computed shapes, and/or ratios thereof related to the object.

8. The method according to claim 7, further comprising computing:
    equivalent perimeter-based ratios and detailed local shapes for inside contours and other high-level variables; and/or
    convexity defect areas and related linear ratios for inside and outside borders, convexities and/or eccentricities.

9. The method according to claim 2, wherein the orientation feature descriptor is determined using at least one angle value of the first component of a principal component analysis, or PCA.

10. The method according to claim 1, wherein the similarity of the query image to the plurality of images included in the database is determined using space metrics applied within a real-time tailored hyper-cube cluster, the hyper-cube cluster being:
    defined by a vector with an m-dimensional radius, of a subset m of the total n-dimensions of the at least two feature descriptors together, with independent and different radius values for each dimension;
    based on an accepted distance percentage of a value of a query image position; and
    limited by a computation of a maximum speed permitted in order to compute all the necessary 1:1 distances within the hyper-cube cluster, wherein the hyper-cube cluster is centered on the space position of the query image.

11. The method according to claim 10, wherein the m-dimensional radius vector is computed for each dimension using at least the query image position, changing mathematically and geometrically from a multidimensional space to a one-dimensional space.

12. The method according to claim 1, wherein the at least two feature descriptors are optimized by applying transform techniques and filtering methods based on statistical classification methods applied to a multi-variant logistical regression analysis.

13. A non-transitory computer readable medium storing a program causing a computer to execute a method for content based image retrieval, the method comprising:
    selecting a query image;
    segmenting the selected query image by applying a segmentation technique;

extracting features from the segmented query image by determining at least two feature descriptors, including a color feature descriptor and a texture feature descriptor; and determining, using the determined at least two feature descriptors of the segmented query image, a similarity of the query image to a plurality of images included in a database, which also include features extracted and computed by said at least two descriptors, wherein the determined color feature descriptor and texture feature descriptor comprise global and local statistical measurements of at least the mean and variance of the numerical values for each of three color channels of each one of at least three different color spaces.

14. The non-transitory computer readable medium according to claim 13, wherein the color feature descriptor and texture feature descriptor are further combined with at least a shape feature descriptor and an orientation feature descriptor.

15. The non-transitory computer readable medium according to claim 13, wherein the determined color feature descriptor and texture feature descriptor may comprise only global statistical measurements of at least the mean and variance of the numerical values for each of three color channels of each one of at least three different color spaces.

16. The non-transitory computer readable medium according to claim 13, further comprising computing a local region of interest, or ROI, of a certain ROI size within the query image in order to distinguish different color and/or texture regions in the query image, wherein the ROI is computed by measuring mean and variance, where the ROI satisfies a distance nearest or farthest to the global statistical measurements.

17. The non-transitory computer readable medium according to claim 16, wherein the ROI size is a percentage of a total area of the query image.

18. The non-transitory computer readable medium according to claim 13, wherein the different color spaces combined simultaneously comprise at least HSV, CieLAB, and CieXYZ.

19. The non-transitory computer readable medium according to claim 14, wherein the shape feature descriptor comprises using low-level invariant Hu moments and other non-linear and dimensionless parameters related to a volume of object, based on areas comprising convex hulls, eccentricities, other derivate computed shapes, and/or ratios thereof related to the object.

20. The non-transitory computer readable medium according to claim 19, further comprising computing:
equivalent perimeter-based ratios and detailed local shapes for inside contours and other high-level variables; and/or
convexity defect areas and related linear ratios for inside and outside borders, convexities, and/or eccentricities.

21. The non-transitory computer readable medium according to claim 14, wherein the orientation feature descriptor is determined using at least one angle value of a first component of a principal component analysis, or PCA.

22. The non-transitory computer readable medium according to claim 13, wherein the similarity of the query image to the plurality of images included in the database is determined using space metrics applied within a real-time tailored hyper-cube cluster, the hyper-cube cluster being:
defined by a vector with an m-dimensional radius, of a subset m of the total n-dimensions of the at least two feature descriptors together, with independent and different radius values for each dimension;
based on an accepted distance percentage of a value of a query image position; and
limited by a computation of a maximum speed permitted in order to compute all necessary 1:1 distances within the hyper-cube cluster, wherein the hyper-cube cluster is centered on the query image position.

23. The non-transitory computer readable medium according to claim 22, wherein the m-dimensional radius vector is computed for each dimension using at least the query image position, changing mathematically and geometrically from a multidimensional space to a one-dimensional space.

24. The non-transitory computer readable medium according to claim 13, wherein the at least two feature descriptors are optimized by applying transform techniques and filtering methods based on statistical classification methods applied to a multi-variant logistical regression analysis.

* * * * *